United States Patent [19]

Mishima et al.

[11] Patent Number: 4,773,931
[45] Date of Patent: Sep. 27, 1988

[54] SPINDLE FERROMAGNETIC ALLOY PARTICLES

[75] Inventors: Akio Mishima; Yosiro Okuda; Hiroshi Sumita; Yoshitaka Yoshinaga; Akira Mukaizaka, all of Hiroshima; Tokihiro Kurata, Higashihiroshima, all of Japan

[73] Assignee: Toda Kogyo Corp., Japan

[21] Appl. No.: 8,113

[22] Filed: Jan. 23, 1987

Related U.S. Application Data

[63] Continuation of Ser. No. 684,681, Dec. 21, 1984, abandoned.

[30] Foreign Application Priority Data

Dec. 27, 1983 [JP] Japan .................................. 58-246462
Nov. 19, 1984 [JP] Japan .................................. 59-245300

[51] Int. Cl.⁴ .................................................. B22F 1/00
[52] U.S. Cl. ...................................... 75/251; 148/308; 420/8; 420/87; 420/117
[58] Field of Search ............... 148/308; 75/251; 420/8, 420/87, 117

[56] References Cited

U.S. PATENT DOCUMENTS

| | | | |
|---|---|---|---|
| 4,284,440 | 8/1981 | Tokunaga et al. | 148/31.57 |
| 4,289,549 | 9/1981 | Kasai | 148/31.57 |
| 4,384,892 | 5/1983 | Suzuki et al. | 75/251 |
| 4,404,024 | 9/1983 | Suzuki et al. | 75/0.5 BA |
| 4,437,882 | 3/1984 | Umemura et al. | 75/0.5 R |
| 4,447,264 | 5/1984 | Suzuki et al. | 148/31.57 |

*Primary Examiner*—John P. Sheehan
*Attorney, Agent, or Firm*—Lyon & Lyon

[57] ABSTRACT

Disclosed herein is spindle ferromagnetic alloy particles having the aspect ratio (major:minor) of less than 3:1 and the coercive force of 500 to 100 Oe, and containing 0.1 to 13 atomic % of Si to Fe, and a process for producing the same.

15 Claims, 5 Drawing Sheets (×20000)

(×20000)

(×20000)

(×20000)

(×20000)

SPINDLE FERROMAGNETIC ALLOY PARTICLES

This application is a continuation of application Ser. No. 684,681, filed Dec. 21, 1984, now abandoned.

BACKGROUND OF THE INVENTION

The present invention relates to ferromagnetic particles for higher recording density, particularly to the spindle ferromagnetic alloy particles which are most suitable for short-wave recording for long-time, and which are uniform in particle size and shape, not contaminated by the dendrites and are highly monodispersed particles and as a result, are large in apparent density and have an excellent dispersibility and which have the ratio of the length of the major axis to that of the minor axis (hereinafter referred to as the aspect ratio) of less than 3:1, particularly less than 2:1 and a coercive force of 500 to 1000 Oe, and also relates to the process for producing the same.

Recently, with the progress of the long-time recording, the miniaturizing and the weight-saving of the reproducing apparatus for magnetic recording such as video tape recorder, the demand for the magnetic recording reproducing apparatus and the magnetic recording media such as magnetic tape, magnetic discs, etc., with higher performance and higher recording density has been intensified.

In order to form the magnetic recording media with high performances and higher recording density, it is necessary to improve the magnetic properties of magnetic particles, for example, the coercive force (Hc) and the saturation magnetization ($\sigma_s$), and their dispersibility in the vehicle and their orientation and loading in a coating medium and to improve the smoothness of the surface of the tape, and to make the residual magnetic flux density (Br) higher and the coating medium thinner. These facts are clearly recognized from the following descriptions, for instance, in "Development of magnetic materials and technique of highly dispersing magnetic particles", page 140, published by SOGO-GIJYUTSU CENTER of Japan (1982).

"In the improvement of the recording density—, it is necessary to increase the residual magnetic flux density Br for securing a predetermined output, and for increasing the residual magnetic flux density Br, the orientation of the magnetic powder into the direction of the magnetic field must be increased and the degree of loading of the magnetic particles must be high.", in page 15 of the same publication, "the important index representing the performance of the magnetic material in magnetic recording is—the recording density, and the improvement of the recording density has been carried out by improving the magnetic head and the recording medium. The improvements which have been carried out in this field are mainly directed to realizing the magnetic layer which is thin in thickness and high in the coercive force(Hc) as the recording medium—.", in page 141 of the same publication, "for a high recording density, it is the most important factor to make the coating medium thin", in page 312 of the same publication, "the condition for obtaining a high recording density while using a recording tape of a coated type is to retain the high output performance with a low noise to the short-wave signals, and for that purpose, it is necessary that both the coercive force(Hc) and the residual magnetic flux density(Br) are large while balancing thereof and thickness of the coating medium is thin" and in page 143 of the same publication, "The amount of floating-up of the head in the case of the head floating-up type such as in the rigid disc device is the major factor of the high recording density, and such a high recording density is possible by decreasing the spacing between the head and the recording medium. However-,—in the case of the surface roughness not small enough, the reduction of the output signal occurs and it causes the headcrush due to the chipping of the head. Accordingly,—it is necessary to carry out the finishing of the surface of the coating medium as smooth as possible."

Since these properties of the medium for magnetic recording have a close relationship to the magnetic particles as the magnetic media, the improvements in the properties of the magnetic particles have been strongly demanded.

The relationship between the specific properties of the magnetic media and properties of the magnetic particles are described in detail as follows.

First of all, the residual magnetic flux density(Br) of the magnetic media depends on the dispersibility of the magnetic particles in the vehicle and their orientation and loading thereof in the coating medium.

In order to improve the dispersibility in the vehicle and the orientation and loading in the coating medium, of the magnetic particles, it is demanded that the particles are uniform in size and shape thereof and not contaminated by dendrites and as a result, that of the particles have large apparent density, and that mutual sintering between the particles is prevented.

In the next place, in order to improve the surface properties of the magnetic recording media, it is demanded that the magnetic particles are preferably excellent in the dispersibility and the orientability and preferably small in the particle size. As such magnetic particles, also it is required that the particles are uniform in size and shape thereof and not contaminated by dendrites and as a result, that the particles have large apparent density, and that mutual sintering between the particles is prevented.

In addition, in order to make the magnetic recording media as thin as possible, it is demanded that the magnetic particles are preferably excellent in the dispersibility and the orientability, and are uniform in size and shape and not contaminated by dendrites and that mutual sintering between the particles is prevented, as is clearly seen in the afore-mentioned publication on page 141 "For making the magnetic recording media as thin as possible, it is necessary to make the size of the magnetic particle as small as possible and to give the excellent orientability in the coating medium. Formation of a thin coating medium is related to make a magnetic paint which is excellent in applicability by using the magnetic particles with small oil absorption."

Also, the magnetic particles for use in magnetic recording have been generally obtained by subjecting (1) the goethite particles which are the starting material, (2) the hematite particles obtained by thermally dehydrating the goethite particles or (3) the goethite particles or the hematite particles both of which contain other metal(s) than Fe to thermal reduction in a reducing gas, thereby obtaining the magnetite particles or ferromagnetic iron alloy particles, or further, subjecting the thus obtained magnetite particles to oxidation to form magnetic maghemite particles.

In order to obtain the magnetic particles which are uniform in particle size and shape and are not contaminated by dendrites and are monodispersed particles and are prevented from the mutual sintering between the particles, it is important at first that the particles used as the starting material are uniform in particle size and shape and not contaminated by the dendrites and the entwined particles, and in the next place, how to subject such a starting material to thermal reduction while retaining the original shape and form thereof becomes a large problem.

Hitherto, the most representative known process for producing the goethite particles as the starting material comprises the steps of adding an aqueous solution of an alkali in an amount more than equivalent into an aqueous solution of a ferrous salt, thereby obtaining an aqueous suspension containing ferrous hydroxide and oxidizing Fe(OH)$_2$ in the thus obtained aqueous suspension at a temperature of lower than 80° C. to obtain the acicular goethite particles. The goethite particles thus obtained are contaminated by dendrites and from the standpoint of particle size thereof, it cannot be said that the particles are uniform in size.

Concerning the step of thermal reduction of the goethite particles, in the case where the goethite particles are subjected to thermal reduction to obtain the magnetic particles, by raising temperature of reduction, the magnetic particles having a large saturation magnetization are produced, however, in the case where the temperature of thermal reduction is too high, the deformation of the magnetic particles and the mutual sintering between the particles becomes remarkable.

The causes of the deformation of the particles and the mutual sintering between the particles in the thermal reduction step are explained as follows.

In general, the hematite particles obtained by thermally dehydrating the goethite particles at a temperature around 300° C. retain the original shape of the goethite particles (hereinafter referred to as the skeleton hematite particles), however, there are many pores on the surface of the particles and within the particles formed by dehydration and accordingly, the growth of the primary unit particles has not been sufficient resulting in the poor crystallization.

On the thermal reduction of such hematite particles, because of the rapid growth of unit particles, in other words, because of the abrupt physical change, the uniform growth of unit particles in the skeleton particles hardly occurs and accordingly, it is considered that the deformation of the particles and the mutual sintering between the particles are caused in the part where the rapid growth of unit particles occurs to give the irregularly shaped particles and sintered particles.

In addition, in the step of thermal reduction for obtaining the ferromagnetic alloy particles, rapid volume contraction of the particle due to the change from metal oxide to metal is caused, and such a rapid volume contraction is one of the reasons of the deformation of the particles.

Accordingly, in order to prevent the deformation of the shape of the particles and the mutual sintering between the particles during the thermal reduction of the hematite particles, it is necessary to have the hematite particles of a high crystallinity and a substantially high density, which retain the original shape of the goethite particles, before subjecting the hematite particles to thermal reduction, by making the sufficient and uniform growth of the hematite particles.

As a method for obtaining such hematite particles of a high crystallinity and a high density, a method comprising subjecting the goethite particles to thermal treatment in a non-reducing atmosphere has been known.

Generally, in the case of thermally dehydrating the goethite particles in a non-reducing atmosphere to obtain the hematite particles, by raising the temperature of thermal treatment, the growth of the unit particle becomes more effective resulting in the improved degree of crystallinity of the skeleton particle, however, it has been known that in the case of the temperature of thermal treatment of over 650° C., mutual sintering between the particles is promoted thereby causing the deformation of the particles.

Accordingly, in order to obtain the hematite particles of an improved crystallinity and a substantially high density in which the particle-shape of the goethite particles has been retained, a method has been known wherein the surface of the goethite particles is coated with an organic compound or an inorganic compound which has an activity of preventing the sintering, before the goethite particles are subjected to thermal treatment in a non-reducing atmosphere.

In order to make a high recording density, it is necessary that the coercive force(Hc) of the magnetic recording media is as high as possible, and for that purpose, it is necessary that the coercive force(Hc) of the magnetic particles to be dispersed in the vehicle is as high as possible.

In the present, as the magnetic particles for magnetic recording, mainly the acicular magnetite particles or the acicular maghemite particles are used, and these particles generally have a coercive force of around 250 to 350 Oe.

In addition, it has been known to improve the coercive force of the magnetic particles by adding cobalt to the above-mentioned acicular magnetite particles or acicular maghemite particles, thereby obtaining the magnetic particles of a coercive force of around 400 to 800 Oe. However, since the saturation magnetization($\sigma_s$) of the thus obtained magnetic particles is 70 to 85 emu/g, in the case of painting such magnetic particles as a magnetic recording media the saturation magnetic flux density (Bm) is at most 2000 Gauss.

For the purpose of obtaining the magnetic recording media of a high density, it is necessary to use the magnetic particles of a high coercive force(Hc) and a large saturation magnetization($\sigma_s$), and those ferromagnetic iron particles and those ferromagnetic alloy particles both of which have a high coercive force(Hc) and a large saturation magnetization($\sigma_s$) are attracting the attention and are in practical use.

Saturation magnetization of the ferromagnetic iron particles or the ferromagnetic alloy particles is around 110 to 170 emu/g, and the coercive force thereof is around 1000 to 1500 Oe, and efforts for still improving the coercive force are still carried out.

The ferromagnetic iron particles and the ferromagnetic alloy particles are obtained by subjecting the acicular particles of ferric iron oxide hydroxide, the acicular particles of ferric oxide or the particles thereof containing a different kind of metal other than Fe as the starting material to thermal reduction in a reducing gas.

However, on the other hand, it has been known that there is a close relationship between the coercive force(Hc) of the magnetic recording media and the performances of the magnetic head, and that in the case where the coercive force(Hc) is too high, since the electric currency for recording becomes too high, in the ferrite head which is most broadly used in the present, the pole tip is magnetically saturated due to the low saturation magnetic flux density (Bm) of the head core, and it becomes impossible to sufficiently magnetize the magnetic recording media.

The above-mentioned facts are clearly seen in the description of Technical Research Report of DENSHI TSUSHIN GAKKAI (The Inst. of Electronics and Communication Engineers of Japan), MR82-19 (1982), page 19.

"In order to record the signals on a high coercive force(Hc) tape (Hc being 1000 to 1500 Oe), a video head using a core of a high saturation magnetic flux density (Bm) is required, and in the case of using a video head of the conventional MnZn ferrite, it is anticipated that the high coercive force(Hc) tape cannot be sufficiently magnetized due to the occurrence of magnetic saturation caused by the deficiency of the saturation magnetic flux density (Bm)."

As has been described above, the coercive force(Hc) of a magnetic recording media and the performances of the magnetic head are in a close relationship, and for that reason, in the apparatus for reproducing the magnetic records which uses the magnetic recording media prepared by using the magnetic particles of the coercive force of less than 1000 Oe such as the acicular magnetite particles, the acicular maghemite particles, the acicular particles of ferric oxide having the surface layer thereof modified by cobalt, etc., a MnZn ferrite head is generally used.

On the other hand, in the apparatus for reproducing the magnetic records which uses the magnetic recording media prepared by using the magnetic particles of the coercive force of larger than 1000 Oe such as ferromagnetic alloy particles, a head prepared by a material of a high saturation magnetic flux density(Bm) such as sendust head, amorphous head, thin film head, etc. is generally used.

However, in the head prepared by one of the above-mentioned materials, a new problem such as the head wearing due to the contact of the magnetic recording media with the head for recording and the head for reproducing has been caused, the problem having been relatively out of the question in the cases where the ferrite head is used.

Accordingly, the ferromagnetic iron particles or the ferromagnetic alloy particles provided with a large saturation magnetization($\sigma_s$) and a suitable coercive force(Hc) for use in the reproducing apparatus of magnetic records with a ferrite head have been demanded.

Namely, as has been discussed above, the coercive force(Hc) of a magnetic recording media should be well balanced in consideration from the two sides, i.e., a high recording density and material for the magnetic head.

At present, as the magnetic recording media used in the reproducing apparatus of magnetic records in which the most popularized ferrite-head has been incorporated, those of a suitable coercive force(Hc) by which a high recording density is possible and the pole tip saturation problem of the ferrite-head can be avoided, namely, the coercive force of 500 to 1000 Oe have been demanded. In order to obtain a magnetic recording media of a coercive force(Hc) of around 500 to 1000 Oe, it is necessary that the magnetic particles to be dispersed in the vehicle has a coercive force of 500 to 1000 Oe.

Further, the ferromagnetic alloy particles, which are not contaminated by dendrites and are monodispersed each other, and as a result, are large in apparent density and excellent in dispersibility in the vehicle, and have a coercive force of from 500 to 1000 Oe, are most eagerly demanded as the magnetic particles by which a high magnetic recording density is possible and pole tip saturation problem of the ferrite-head can be avoided.

However, the goethite particles, which are the starting material of the above-mentioned ferromagnetic alloy particles, obtained by the afore-mentioned, known process are contaminated by the dendrites, as has been stated, and cannot be said that they are uniform in particle size, and they are acicular-shape with the axial ratio of larger than 10:1.

The ferromagnetic alloy particles obtained by subjecting such goethite particles which are contaminated by the dendrites and not uniform in particle size to thermal reduction in a reducing gas are also contaminated by the dendrites and not uniform in particle size. In the case where a magnetic recording media is prepared while using such ferromagnetic alloy particles, the dispersibility thereof in the vehicle and the orientation and loading thereof in the coating film are poor resulting in the reduced residual magnetic flux density.

Accordingly, the present inventors paid an attention to a process for producing the goethite particles by blowing an oxygen-containing gas into an aqueous suspension containing $FeCO_3$, which has been obtained by reacting an aqueous solution of a ferrous salt with an alkali carbonate(refer to Japanese Patent Application Laying-Open No. 50-80999).

By actually carrying out the above-mentioned process, spindle goethite particles which are uniform in particle size and shape and not contaminated by the dendrites are obtained.

The spindle ferromagnetic alloy particles obtained by subjecting the thus obtained, spindle goethite particles which are uniform in particle size and shape and not contaminated by dendrites as the starting material to thermal reduction are also uniform in particle size and not contaminated by the dendrites, however, the coercive force of the thus obtained ferromagnetic alloy particles is larger than 1000 Oe. The fact is clearly seen, for instance, in the description of Example 3 of Japanese Patent Application Laying-Open No. 53-10100. Namely, Example 3 thereof discloses the process for obtaining the ferromagnetic alloy particles comprising the steps of blowing an oxygen-containing gas into an aqueous suspension containing $FeCO_3$ obtained by reacting an aqueous solution of a ferrous salt with an alkali carbonate, thereby obtaining spindle goethite particles and subjecting the thus obtained, spindle goethite particles to thermal reduction. The coercive force of the thus obtained ferromagnetic alloy pparticles is 1020 to 1165 Oe.

Accordingly, the offer of a process for producing spindle ferromagnetic alloy particles which are not contaminated by dendrites, are uniform in particle size and shape and have the coercive force of 500 to 1000 Oe is also strongly demanded.

In consideration of the above-mentioned facts, the present inventors have studied the conditions for obtaining the magnetic particles which are uniform in particle size and shape and not contaminated by dendrites, and have a large value of saturation magnetization($\sigma_s$) and a coercive force of about 500 to 1000 Oe, and as a result of the present inventors' studies, they have attained the present invention.

BRIEF EXPLANATION OF DRAWINGS

Of the attached drawings,

FIGS. 4 and 5 are those of the spindle ferromagnetic alloy particles containing Si prepared respectively in Example 23 and Example 27. FIG. 6 is that of the spindle ferromagnetic alloy particles not containing Si prepared in Comparative Example 2.

FIGS. 7 and 8 are those of the spindle ferromagnetic alloy particles containing Si and P prepared respectively in Example 57 and Example 59.

SUMMARY OF THE INVENTION

Figure 1:
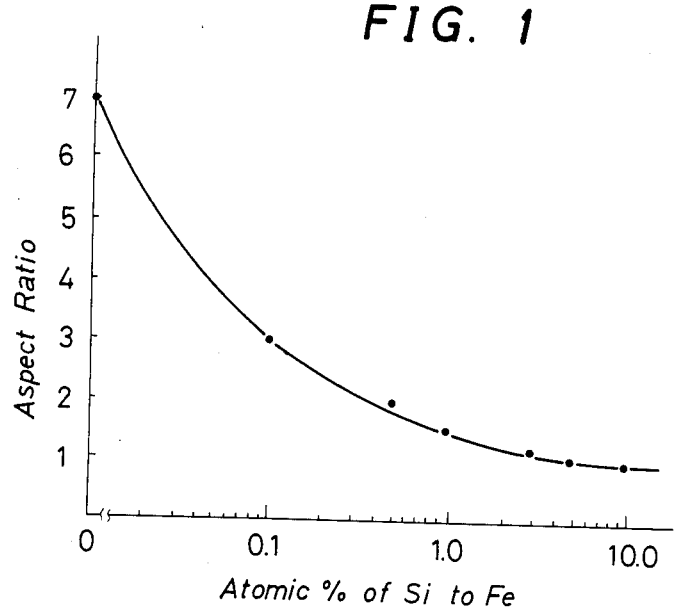
FIG. 1 shows the relationship between the amount of the water-soluble silicate and the aspect ratio of the spindle goethite particles containing Si.

In a first aspect of the present invention, there are provided spindle ferromagnetic alloy particles having the aspect ratio(major:minor) of less than 3:1, and the coercive force of 500 to 1000 Oe, and containing 0.1 to 13 atomic % of Si to Fe.

In a second aspect of the present invention, there are provided spindle ferromagnetic alloy particles having the aspect ratio(major:minor) of less than 3:1, and the coercive force of 500 to 1000 Oe, and containing 0.3 to 13 atomic % of Si to Fe and 0.1 to 2.5 atomic % of P to Fe.

In a third aspect of the present invention, there is provided a process for producing spindle ferromagnetic alloy particles containing Si, the process comprising the steps of:

oxidizing $FeCO_3$ in an aqueous suspension by blowing an oxygen-containing gas into the aqueous suspension containing $FeCO_3$, obtained by reacting an aqueous solution of a ferrous salt with an alkali carbonate, wherein a water-soluble silicate is added into said alkali carbonate, into said aqueous solution of a ferrous salt or into said aqueous suspension containing $FeCO_3$ before blowing said oxygen-containing gas thereinto in an amount of 0.1 to 13 atomic % (calculated as Si) to Fe of said ferrous salt, thereby obtaining spindle goethite particles containing Si, and subjecting the thus obtained spindle goethite particles containing Si or spindle hematite particles containing Si obtained by thermally dehydrating said spindle goethite particles containing Si to thermal reduction in a reducing gas thereby obtaining spindle ferromagnetic alloy particles containing 0.1 to 13 atomic % of Si to Fe.

In a fourth aspect of the present invention, there is provided a process for producing spindle ferromagnetic alloy particles containing Si, the process comprising the steps of:

oxidizing $FeCO_3$ in an aqueous suspension by blowing an oxygen-containing gas into the aqueous suspension containing $FeCO_3$, obtained by reacting an aqueous solution of a ferrous salt with an alkali carbonate, wherein a water-soluble silicate is added into said alkali carbonate, into said aqueous solution of a ferrous salt or into said aqueous suspension containing $FeCO_3$ before blowing said oxygen-containing gas thereinto in an amount of 0.1 to 13 atomic % (calculated as Si) to Fe of said ferrous salt, thereby obtaining spindle goethite particles containing Si, bringing the thus obtained spindle goethite particles containing Si or spindle hematite particles containing Si obtained by thermally dehydrating said spindle goethite particles containing Si into suspension in water, adding a phosphate into said suspension in an amount of 0.1 to 2.5 atomic % (calculated as P) to Fe of said ferric iron oxide hydroxide at a pH of higher than 8, further adding a water-soluble silicate into the resultant aqueous suspension in an amount of 0.2 to 8.0 atomic % (calculated as Si) to Fe of said ferric iron oxide hydroxide so that the total amount of said added silicate is less than 13 atomic % (calculated as Si) to Fe of said ferric iron oxide hydroxide.

adjusting the pH of the thus obtained aqueous suspension to from 3 to 7, thereby obtaining spindle goethite particles containing Si or spindle hematite particles containing Si, coated with a phosphorus compound and a silicon compound, and subjecting the thus obtained spindle goethite particles containing Si, coated with phosphorus compound and silicon compound or the thus obtained spindle hematite particles containing Si, coated with phosphorus compound and silicon compound to thermal reduction in a reducing gas, thereby obtaining spindle ferromagnetic alloy particle containing 0.3 to 13 atomic % of Si to Fe and 0.1 to 2.5 atomic % of P to Fe.

In a fifth aspect of the present invention, there is provided a process for producing spindle ferromagnetic alloy particles containing Si, the process comprising the steps of:

oxidizing $FeCO_3$ in an aqueous suspension by blowing an oxygen-containing gas into the aqueous suspension containing $FeCO_3$, obtained by reacting an aqueous solution of a ferrous salt with an alkali carbonate, wherein a water-soluble silicate is added into said alkali carbonate, into said aqueous solution of a ferrous salt or into said aqueous suspension containing $FeCO_3$ before blowing said oxygen-containing gas thereinto in an amount of 0.1 to 13 atomic % of Si to Fe of said ferrous salt, thereby obtaining spindle goethite particles containing Si, subjecting the thus obtained spindle goethite particles containing Si to thermal treatment in a non-reducing atmosphere at a temperature of from 400° to 600° C., thereby obtaining spindle hematite particles containing Si which are substantially high in density, and subjecting the thus obtained spindle hematite particles containing Si to thermal reduction in a reducing gas, thereby obtaining spindle ferromagnetic alloy particles containing 0.1 to 13 atomic % of Si to Fe.

In a sixth aspect of the present invention, there is provided a process for producing spindle ferromagnetic alloy particles containing Si, the process comprising the steps of:

oxidizing $FeCO_3$ in an aqueous suspension by blowing an oxygen-containing gas into the aqueous suspension containing $FeCO_3$, obtained by reacting an aqueous solution of a ferrous salt with an alkali carbonate, wherein a water-soluble silicate is added into said alkali carbonate, into said aqueous solution of a ferrous salt or into said aqueous suspension containing $FeCO_3$ before blowing said oxygen-containing gas thereinto in an amount of 0.1 to 13 atomic % of Si to Fe of said ferrous salt, thereby obtaining spindle goethite particles containing Si, bringing the thus obtained spindle goethite particles containing Si into suspension in water, adding a phosphate into said suspension in an amount of 0.1 to 2.5 atomic % (calculated as P) to Fe of said ferric iron oxide hydroxide at a pH of higher than 8, further adding, a water-soluble silicate into the resultant aqueous suspension in an amount of 0.2 to 8.0 atomic % (calculated as Si) to Fe of said ferric iron oxide hydroxide so that the total amount of said added silicate is less than 13 atomic % (calculated as Si) to Fe of said ferric iron oxide hydroxide, adjusting the pH of the thus obtained aqueous suspension to from 3 to 7, thereby obtaining said spindle goethite particles containing Si, coated with a phosphorus compound and a silicon compound, subjecting the spindle goethite particles containing Si, covered with phosphorus compound and silicon compound to thermal treatment in a non-reducing atmosphere at 500° to 900° C., thereby obtaining the spindle hematite particles containing Si which are substantially high in density and are coated with phosphorus compound and silicon compound, and subjecting the thus obtained spindle hematite particles containing Si, coated with phosphorus compound and silicon compound to thermal reduction in a reducing gas thereby obtaining spindle ferromagnetic particles containing 0.3 to 13 atomic % of Si to Fe and 0.1 to 2.5 atomic % of P to Fe.

DETAILED DESCRIPTION OF THE INVENTION

The spindle ferromagnetic alloy particles according to the present invention are characterized in that the particles are uniform in particle size and shape and not contaminated by the dendrites, and have a coercive force in the range of 500 to 1000 Oe which is suitable for avoiding the pole tip saturation problem of ferrite head, and which makes a high magnetic recording density possible.

Namely, the spindle ferromagnetic alloy particles according to the present invention having an aspect ratio of less than 3:1 and a coercive force(Hc) of 500 to 1000 Oe, which contain 0.1 to 13 atomic % of Si to Fe, are uniform in particle size and shape and not contaminated by the dendrites and are highly monodispersed each other, the spindle ferromagnetic alloy particles being produced by the steps of:

oxidizing $FeCO_3$ in an aqueous suspension by blowing an oxygen-containing gas into the aqueous suspension containing $FeCO_3$, obtained by reacting an aqueous solution of a ferrous salt with an alkali carbonate, wherein a water-soluble silicate is added into said alkali carbonate, into said aqueous solution of a ferrous salt or into said aqueous suspension containing $FeCO_3$ before blowing said oxygen-containing gas thereinto in an amount of 0.1 to 13 atomic % (calculated as Si) to Fe of said ferrous salt, thereby obtaining spindle goethite particles containing Si, and subjecting the thus obtained spindle goethite particles containing Si, spindle hematite particles containing Si obtained by thermally dehydrating said spindle goethite particles containing Si or spindle hematite particles containing Si of a substantially high density obtained by subjecting the spindle goethite particles to thermal treatment in a non-reducing atmosphere at a temperature of 400° to 600° C., to thermal reduction in a reducing gas.

Also, the spindle ferromagnetic alloy particles according to the present invention having an aspect ratio of less than 3:1 and a coercive force of 500 to 1000 Oe, which contain 0.3 to 13 atomic % of Si to Fe and 0.1 to 2.5 atomic % of P to Fe, are uniform in particle size and not contaminated by the dendrites and are highly monodispersed each other, the spindle ferromagnetic alloy particles being produced by the steps of:

oxidizing $FeCO_3$ in an aqueous suspension by blowing an oxygen-containing gas into the aqueous suspension containing $FeCO_3$, obtained by reacting an aqueous solution of a ferrous salt with an alkali carbonate, wherein a water-soluble silicate is added, into, said, alkali carbonates into said aqueous solution of a ferrous salt or into said aqueous suspension containing $FeCO_3$ before blowing said oxygen-containing gas thereinto in an amount of 0.1 to 13 atomic % (calculated as Si) to Fe of said ferrous salt, thereby obtaining spindle goethite particles containing Si, bringing the thus obtained spindle goethite particles containing Si or spindle hematite particles containing Si obtained by thermally dehydrating said spindle goethite particles containing Si into suspension in water, adding a phosphate into said suspension in an amount of 0.1 to 2.5 atomic % (calculated as P) to Fe of said ferric iron oxide hydroxide at a pH of higher than 8, further adding a water-soluble silicate into the resultant aqueous suspension in an amount of 0.2 to 8.0 atomic (calculated as Si) to Fe of said ferric iron oxide hydroxide so that the total amount of said added silicate is less than 13 atomic % (calculated as Si) to Fe of said ferric iron oxide hydroxide, adjusting the pH of the thus obtained aqueous suspension to from 3 to 7, thereby obtaining spindle goethite particles containing Si or spindle hematite particles containing Si, coated with a phosphorus compound and a silicon compound, and subjecting the thus obtained spindle goethite particles containing Si, coated with phosphorus compound and silicon compound or the thus obtained spindle hematite particles containing Si, coated with phosphorus compound and silicon compound to thermal reduction in a reducing gas.

Although it has not yet been elucidated why the processes of the present invention can regulate the coercive force of the spindle ferromagnetic alloy particles of the present invention to the level of 500 to 1000 Oe, the present inventors are in an opinion that the reason lies in the reduced anisotropy in the shape of the thus prepared spindle ferromagnetic alloy particles according to the present invention.

Namely, in the preparation of the spindle goethite particles as the starting material, in the case where a water-soluble silicate is preliminarily added to an aqueous solution of a ferrous salt, to an alkali carbonate or to an aqueous solution containing $FeCO_3$ obtained by reacting the aqueous solution of a ferrous salt with the alkali carbonate before blowing the oxygen-containing gas to oxidize $FeCO_3$ therein, the aspect ratio of the spindle goethite particles containing Si, formed therefrom is smaller than that of the particles formed in the case where the water-soluble silicate is not added, and the aspect ratio of the ferromagnetic alloy particles obtained by subjecting the spindle goethite particles of a smaller aspect ratio as the starting material to thermal reduction is also smaller, and as a result, the shape anisotropy is smaller.

Also, after separating the goethite particles from the suspension in which the goethite particles containing Si are formed by the wet reaction between an aqueous solution of a ferrous salt and an aqueous solution of an alkali carbonate, and bringing thereof into suspension in water, a phosphate is added to the aqueous suspension in an amount of 0.1 to 2.5 atomic % (calculated as P) to Fe at a pH of higher than 8, and after further adding a water-soluble silicate to the aqueous suspension in an amount of 0.2 to 8.0 atomic % (calculated as Si) to Fe, the pH of the resultant suspension is adjusted to 3 to 7, to form spindle goethite particles containing Si, coated with phosphorus compound and silicon compound.

In general, the goethite particles have entwined to each other during the course of growth of the crystals thereof in the suspension in the time of wet reaction and as a result the aggregated particles are formed and accordingly, in the case of coating such entwined and aggregated particles with a sintering-preventing agent, although the further sintering can be prevented, because of the retained entwining and aggregated which have been formed in the course of growth of crystals during the reaction, the ferromagnetic alloy particles produced by subjecting to the thermal reduction the particles obtained by subjecting the thus entwined and aggregated goethite particles to thermal treatment in a non-reducing atmosphere are entwined and aggregated to each other. It cannot be said that the dispersibility of such particles in the vehicle and the orientation and loading thereof in the painted membrane are sufficient.

Consequently, it is necessary to preliminarily unwind the entwining and aggregation of the goethite particles, formed in the course of crystal growth during the reaction before coating the particles with the silicon compound. The entwining and aggregation of the goethite particles are unravelled by the steps of separating the goethite particles from the suspension, then suspending the particles in water, and adding a salt of phosphoric acid in an amount of 0.1 to 2.5 atomic % (calculated as P) to Fe in the aqueous suspension at a pH of higher than 8. The goethite particles to be subjected to the above-mentioned steps are those which are formed as above, then filtrated, washed with water and dried.

The concentration of the goethite particles in the aqueous suspension is preferably less than 20% by weight of water in the aqueous suspension, and in the case of larger than 20% by weight, the viscosity of the aqueous suspension is too high to exhibit the effect of unwinding the entwining of the goethite particles sufficiently.

In the case where the amount of the phosphate is 0.1 to 2.5 atomic % (calculated as P) to Fe in the aqueous suspension, it is possible to unwind the entwined particles and to disperse the particles uniformly in the suspension.

The thus added phosphate is adsorbed on the surface of the goethite particles, and as is shown in Table 5, the thus treated goethite particles contained 0.3 to 1.96 atomic % (calculated as P) to Fe.

In the case where the amount of the phosphate is less than 0.1 atomic % (calculated as P) to Fe, the effect of adding the phosphate is not exhibited sufficiently, and on the other hand, in the case of more than 2.5 atomic % (calculated as P) to Fe, although it is possible to disperse the particles, it becomes difficult to separate the particles from the aqueous suspension by filtration, because the particles have been strongly dispersed uniformly.

As the phosphate to be added, for instance, sodium metaphosphate, sodium pyrophosphate and the like may be mentioned.

The pH of the aqueous suspension to which the phosphate is added must be higher than 8, and in the case of pH of lower than 8, the phosphate must be added in an amount of more than 2.5 atomic % (calculated as P) for dispersing the particles, and the addition of such a large amount results in the above-mentioned difficulty of separation in filtration and accordingly, is unfavorable.

Concerning the coating of the silicon compound to be formed on the surface of the goethite particles, the formation of the silicon compound on goethite particles must be carried out after the entwining of the goethite particles has been unwinded.

The pH of the aqueous suspension in the time of adding the water-soluble silicate(water-soluble salt of silicic acid) thereto is preferably higher than 8. In the case of adding the silicate to the suspension of pH of lower than 8, $SiO_2$ begins to separate singly in a solid state at the same time of the addition of the silicate and it is impossible to effectively make $SiO_2$ form unform coating on the surface of the particles.

Accordingly, the water-soluble slicate is added into the aqueous suspension at pH of higher than 8, and after mixing the silicate uniformly in the suspension, the pH of the resultant suspension is adjusted to 3 to 7 (at which $SiO_2$ separates out), thereby forming a coating of $SiO_2$ on the surface of the particles.

The amount of the water-soluble silicate to be added to the aqueous suspension is 0.2 to 8.0 atomic % (calculated as Si) to Fe.

The thus added water-soluble silicate separates as $SiO_2$ and adsorbed on the surface of the goethite particles as will be shown in Table 5.

In the case where the amount of the water-soluble silicate to be added is less than 0.2 atomic % (calculated as Si) to Fe, the effect of addition of the silicate is not remarkably exhibited, and on the other hand, in the case of more than 8 atomic % (calculated as Si) to Fe, the thermal reduction takes a long time.

As the water-soluble silicate to be added for that purpose, sodium silicate, potassium silicate and the like may be mentioned.

The conditions for separating the goethite particles by filtration after having formed the silicon compound and phosphorus compound on the surface thereof are as follows.

In the case of using the conventional means of filtration, the strong and uniform dispersion of the particles causes the aggravation of the filtering efficiency such as leakage from the filter-mesh, clogging thereof, etc.

In order to improve the filtering efficiency, it is necessary that the particles thus dispersed by the addition of the phosphate are moderately flocculated.

Namely, in the case where the phosphate is added in an amount of 0.1 to 2.5 atomic % (calculated as P) to Fe, by adjusting the pH of the aqueous suspension to lower than 7, the viscosity of the suspension is raised to cause the moderate flocculation of the particles, thereby the filtration and separation of the particles are facilitated.

In addition, although even in the case where the pH of the aqueous suspension is adjusted to lower than 3, the flocculation of the goethite particles, the adsorption of the phosphate thereto and the formation of the coating of $SiO_2$ on the surface of the particles are possible, such a pH is not favorable because of the problems of the apparatus and the quality of the product (due to dissolution, etc.).

For adjusting the pH of the aqueous suspension to from 3 to 7, acetic acid, sulfuric acid, phosphoric acid and the like may be used.

The hematite particles obtained by subjecting the goethite particles coated with the silicon compound and the phosphorus compound to thermal treatment are high in crystallinity and of a substantially high density, and in addition, they retain the original shape and form of the starting material without entwining and aggregation to each other.

The temperature at which the goethite particles are subjected to thermal treatment in a non-reducing atmosphere is preferably in a range of from 500° to 900° C. In the case of the temperature of lower than 500° C., the thus obtained hematite particles covered with the phosphorus compound and the silicon compound are the highly crystallized particles of a substantially high density. On the other hand, in the case of the temperature of higher than 900° C., the deformation of the shape and form of the particles and the mutual sintering between the particles are caused unfavorably.

The ferromagnetic alloy particles according to the present invention obtained by subjecting to the thermal reduction in a reducing gas the hematite particles covered with the phosphorus compound and the silicon compound which are in a highly crystallized state and in a substantially high density and retain the original shape and form of the particles of the starting material, are also the particles whose crystallinity has been raised in the surface thereof and in the inside thereof and the density has been substantially raised, and which retain the original shape and form of the particles of the starting material without contamination by the entwining and aggregation particles.

The present invention is explained as follows while referring to the Examples carried out by the present inventors Of the attached drawings, FIG. 1 is a graph showing the relationship between the amount of addition of the water-soluble silicate and the aspect ratio of the spindle goethite particles containing Si which were prepared by the followings.

Namely, 3.0 liters of an aqueous solution of ferrous sulfate containing $Fe^{2+}$ at a concentration of 1.0 mol/liter were added to 2.0 liters of an aqueous solution of sodium carbonate to which sodium silicate had been preliminarily added in an amount of 0 to 10 atomic % (calculated as Si) to Fe, thereby obtaining an aqueous suspension containing $FeCO_3$ at a pH of about 10, and then air was blowed into the resultant aqueous suspension at 50° C. and at a rate of 15 liters/min to carry out oxidation, thereby the spindle goethite particles containing Si were obtained.

As is clearly seen in FIG. 1, there is a tendency that in the case where the amount of the added water-soluble silicate is larger, the aspect ratio is smaller.

Figure 2:
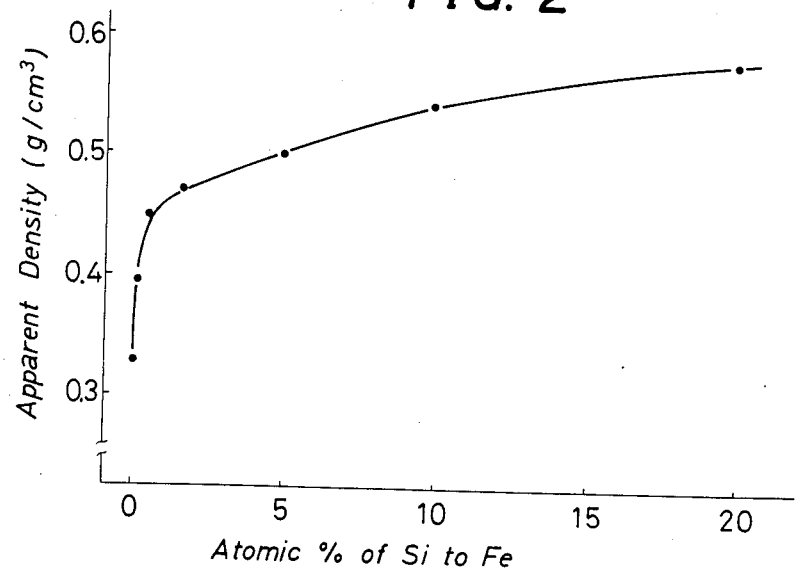
FIG. 2 shows the relationship between the amount of the water-soluble silicate and the apparent density of the spindle goethite particles containing Si.

FIG. 2 is a graph showing the relationship between the amount of addition of the water-soluble silicate and the apparent density of the spindle goethite particles containing Si obtained as in the case of FIG. 1.

As is clearly seen in FIG. 2, tnere is a tendency that in the case where the amount of the added water-soluble silicate is larger, the apparent density is larger.

Figure 3:
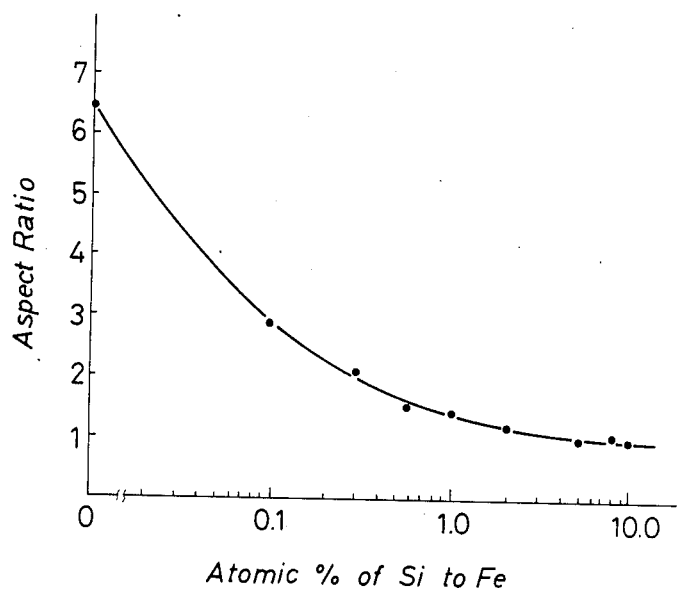
FIG. 3 shows the relationship between the amount of the water-soluble silicate and the aspect ratio of the spindle ferromagnetic alloy particles containing Si.

FIG. 3 is a graph showing the relationship between the amount of addition of the water-soluble silicate and the aspect ratio of spindle ferromagnetic alloy particles containing Si obtained by subjecting the spindle goethite particles containing Si to thermal reduction.

More in detail, FIG. 3 is a graph showing the relationship between the amount of a water-soluble silicate to be added and the aspect ratio of the spindle ferromagnetic alloy particles containing Co and Si, which were prepared by the process comprising the steps of:

adding 3.0 liters of an aqueous solution of ferrous sulfate of a concentration of $Fe^{2+}$ of 1.0 mol/liter, and cobalt sulfate in an amount of 5.0 atomic % (calculated as Co) to Fe, to 2.0 liters of an aqueous solution of sodium carbonate to which sodium silicate had been preliminarily added in an amount of 0 to 10 atomic % (calculated as Si) to Fe into a reaction vessel, thereby obtaining an aqueous suspension containing $FeCO_3$ at a pH of about 10, blowing air into the thus obtained aqueous suspension at 50° C. and at a rate of 15 liters min to carry out oxidation, thereby obtaining spindle goethite particles containing Si and Co, subjecting the thus obtained spindle goethite particles containing Si and Co to thermal treatment in air at 500° C., thereby obtaining spindle hematite particles containing Si and Co of a substantially high density, subjecting the thus obtained spindle hematite particles containing Co and Si of a substantially high density to thermal reduction at 300° C. for 3 hours, thereby obtaining the spindle ferromagnetic alloy particles containing Co and Si.

As is seen clearly in FIG. 3, there is a tendency that in the case where the added amount of the water-soluble silicate is larger, the aspect ratio of the spindle ferromagnetic alloy particles containing Co and Si is smaller.

In the case where the aspect ratio of the spindle ferromagnetic alloy particles containing Co and Si is less than 3:1, it is possible to regulate the coercive force(Hc) of the particles in a range of from 500 to 1000 Oe, and in the case of the above-mentioned aspect ratio of less than 2:1, it is possible to regulate the coercive force(Hc) thereof in a range of from 500 to 800 Oe.

As seen from Example 3 of the afore-mentioned Japanese Patent Application Laying-Open No. 53-10100, the spindle goethite particles of the aspect ratio of 5:1 were used as the starting material, and the aspect ratio of the spindle ferromagnetic alloy particles obtained by subjecting the goethite particles to thermal reduction is also 5:1 which is the same as that of the starting material, i.e. the goethite particles as are seen in FIG. 3 (B).

It is considered that as a result of the above-mentioned facts, the coercive force of the product of Japanese Patent Application Laying-Open No. 53-10100 was larger than 1000 Oe.

The conditions in the preparation according to the present invention are as follows.

As the aqueous solution of a ferrous salt used in the present invention, those of ferrous sulfate, ferrous chloride, etc. may be mentioned.

As the alkali carbonate used in the present invention, sodium carbonate, potassium carbonate and ammonium carbonate are singly used, and they may be used together with an alkali hydrogen carbonate such as sodium hydrogen carbonate, potassium hydrogen carbonate and ammonium hydrogen carbonate.

The temperature of the oxidation of the aqueous suspension containing $FeCO_3$ in the present invention is in a range of 40° to 80° C., and in the case where the temperature is lower than 40° C., it is difficult to obtain the spindle goethite particles, and on the other hand, in the case where the temperature is higher than 80° C., the product is contaminated by particles of $Fe_3O_4$.

The pH of the above-mentioned reaction in the present invention is in the range of 7 to 11, and in the case where the pH is lower than 7 or higher than 11, it is difficult to obtain the spindle goethite particles.

The oxidation of the present invention is conducted by blowing an oxygen-containing gas, for instance, air into the suspension containing $FeCO_3$.

As the water-soluble silicate used in the present invention, sodium silicates and potassium silicates may be mentioned. The water-soluble silicate used in the present invention participates in determination of the aspect ratio of the thus formed goethite particles and accordingly, it is necessary to bring the water-soluble silicate into existence in the reaction system before the formation of the goethite particles. Namely, the water-soluble silicate is added to the aqueous solution of the ferrous salt, to the alkali carbonate or to the aqueous suspension containing $FeCO_3$ before blowing the oxygen-containing gas into the suspension.

The amount of addition of the water-soluble silicate in the present invention is 0.1 to 13 atomic % (calculated as Si) to Fe. In the case where the amount is less than 0.1 atomic % (calculated as Si) to Fe, the effect of reducing the aspect ratio of the spindle ferromagnetic alloy particles which is the object of the present invention, cannot be sufficiently attained. On the other hand, in the case where the amount of the water-soluble silicate is larger than 13 atomic % (calculated as Si) to Fe, it is possible to obtain the spindle ferromagnetic alloy particles of a small aspect ratio, however, the effect of reducing the aspect ratio is becoming small and as a result it is not necessary to add the water-soluble silicate more than 13 atomic % (calculated as Si) to Fe.

In consideration of the aspect ratio and the saturation magnetization of the spindle ferromagnetic alloy particles of the present invention, the amount of addition of the water-soluble silicate is preferably from 0.3 to 8 atomic % (calculated as Si) to Fe.

Almost all the added amount of the water-scluble silicate is contained in the thus formed goethite particles, and as are shown in Table 1, the thus obtained goethite particles contain nearly the same amount of Si as that added, namely the amount of 0.10 to 10.02 atomic % (calculated as Si) to Fe in the goethite, and the ferromagnetic alloy particles obtained by subjecting the goethite particles to thermal reduction contain nearly the same amount of Si as that added, namely the amount corresponding to 0.100 to 10.00 atomic % (calculated as Si) to Fe in the product as is seen in Table 3.

In the case of coating-treatment of the particles with the water-soluble silicate according to the present invention, the amount of the water-soluble silicate to be added is 0.2 to 8.0 atomic % (calculated as Si) to Fe, however, the total amount of the water-soluble silicate, which is the sum of the amount thereof added in the formation of the spindle goethite particles and the amount thereof added in the coating treatment with the water-soluble silicate, is less than 13 atomic % (calculated as Si) to Fe. In the case where the amount is larger than 13 atomic % calculated a Si) to Fe, since the saturation magnetization of the ferromagnetic alloy particles obtained by thermal reduction of the spindle goethite particles coated with the silicon compound and the phosphorus compound, is reduced and accordingly, such a large amount of Si is not favorable.

Concerning the thermal reduction of the goethite particles, in the case where the goethite particles are subjected to thermal reduction to obtain the magnetic particles, by raising temperature of reduction, the magnetic particles having a large saturation magnetization are produced, however, in the case where the temperature of thermal reduction is too high, the deformation of the magnetic particles and the mutual sintering between the particles become remarkable.

In general, the hematite particles obtained by thermally dehydrating the goethite particles at a temperature around 300° C. retain the original shape of the goethite particles, however, there are many pores on the surface of the particles and within the particles formed by dehydration and accordingly, the growth of unit particles in the skeleton particles have not been sufficient resulting in the poor crystallization.

On the thermal reduction of such hematite particles, because of the rapid growth of the unit particles, in other words, because of the abrupt physical change, the uniform growth of the unit particles hardly occurs and accordingly, it is considered that the deformation of the particles and the mutual sintering between the particles are caused in the part where the rapid growth of the unit particles occurs to give the irregularly shaped particles and sintered particles.

In addition, in the step of thermal reduction for obtaining the ferromagnetic particles, a rapid volume contraction of the particle due to the change from metal oxide to metal is caused, and such a rapid volume contraction is one of the reasons of the deformation of the particles.

Accordingly, in order to prevent the deformation of the shape of the particles and the mutual sintering between the particles during the thermal reduction of the hematite particles, it is necessary to have the hematite particles of highly crystallized and a substantially high density, which have retained the original shape of the goethite particles by making the sufficient and uniform growth of the hematite particles before subjecting the hematite particles to thermal reduction.

As a method for obtaining such hematite particles of highly crystallized and a high density, a method comprising subjecting the goethite particles to thermal treatment in a non-reducing atmosphere at 400° to 600° C. has been known. In the case of thermal treatment of the goethite particles at a temperature of lower than 400° C., the crystallinity and the density of the obtained hematite particles are not sufficient, and on the other hand, in the case of the treating temperature of higher than 600° C., the deformation of the thus obtained hematite particles and the mutual sintering between the particles are caused.

In the present invention, the temperature cf the thermal reduction at which the spindle goethite particles containing Si or the spindle hematite particles containing Si obtained by thermally dehydrating thereof are subjected to thermal reduction is preferably in the range of frm 300° to 450° C. In the case of the temperature of thermal reduction is lower than 300° C., the thermal reduction proceeds slowly to take a long time period, and on the other hand, in the case of the temperature of thermal reduction is higher than 450° C., the thermal reduction proceeds so rapidly that the deformation of the thus reduced particles and the mutual sintering of the reduced particles are caused.

The temperature at which the spindle goethite particles containing Si of a substantially high density are subjected to thermal reduction is preferably in the range of from 300° to 450° C.

The temperature of the thermal reduction at which the spindle goethite particles containing Si, coated with the phosphorus compound and the silicon compound or the spindle hematite containing Si, coated with the phosphorus compound and the silicon compound which are obtained by thermally dehydrating the spindle goethite particles are subjected t©thermal reduction, is preferably in the range of 350° to 600° C. In the case where the thermal reduction is carried out at temperatures of lower than 350° C., the progress of the thermal reduction proceeds slowly to take a longer time to completion, and on the other hand, in the case of carrying out the thermal reduction at temperatures higher than 600° C., the thermal reduction proceeds violently to cause the deformation of the shape and form of the particles and the sintering between the particles.

The temperature of the thermal reduction at which the spindle hematite particles containing Si, coated with the phosphorus compound and silicon compound, which are substantially high in density, are subjected to thermal reduction, is also preferably in the range of from 350° to 600° C.

The present invention exhibits the following effects.

Namely, according to the present invention, spindle ferromagnetic alloy particles containing Si, which are uniform in particle size and not contaminated by dendrites and have a coercive force of about 500 to 1000 Oe, can be obtained, and the spindle ferromagnetic alloy particle containing Si are suitable for use as the magnetic particles for high magnetic recording density. In addition, since the spindle-shaped ferromagnetic alloy particles containing Si are small in the aspect ratio of less than 3:1, particularly less than 2:1, the ferromagnetic alloy particles containing Si are suitable for use as the magnetic particles for short-wave recording.

That the magnetic particles of a small ratio of the major axis to the minor axis are suitable for short-wave recording is clearly seen in the descriptions of, for instance, Japanese Patent Application No. 57-183626.

"The present invention is characterized—that instead of using the conventional acicular particles of 0.4 to 2 or 0.3 to 1 μm in length and of the aspect ratio (major/minor) of from 5 to 20, using the particles of smaller than 0.3 μm in length with the aspect ratio of larger than 1 and smaller than 3, the use of such particles reducing the noise level due to discontinuous magnetization caused by the size of the particles, suppressing the tendency of the particles to orient in a parallel direction in the plane and if necessary, giving to the particles a tendency to orient along a perpendicular direction in the plane for obtaining a large residual magnetization perpendicular to the plane." and "Since the thus obtained magnetic recording media have, as are shown in Examples, a large output in a range of smaller wave length of recording, for instance, at 1 μm, and have a low noise, the magnetic recording media are excellent in the ratio of S/N."

Furthermore, in the case where the spindle ferromagnetic alloy particles containing P and Si of the present invention are used in the preparation of a magnetic paint, the ferromagnetic alloy particles containing Si are favorably dispersed in the vehicle and highly loaded into the coating medium and accordingly, it is possible to obtain the favorable magnetic recording materials.

The above-mentioned effects of the present invention are exhibited favorably also in the cases where the different kinds of metals other than Fe such as Co, Mg, Al, Cr, Zn, Ni, Ti, Mn, Sn, Pb, etc. are added in the step of formation of goethite particles, as the starting material, for the improvement of the performances of the ferromagnetic alloy particles.

It is added that the aspect ratio (major/xinor) and the length (the major axis) of the particles shown in the Examples indicate the mean values of the actual values measured on more than 100 particles appearing in the electron microscope photograph with more than 2 visual fields enlarged at more than 100,000 times, that the apparent density of the particles were measured while following the standard method in Japanese Industrial Standards(JIS) K 5101 (Test Methods of Pigments) and that the amount of Si, Co, Ni and P in the particles were measured by carrying out fluorescent X-ray analysis on the specimens of the particles while following the method shown in JIS K 0119 (General Rules for Fluorescent X-ray Analysis) and using a fluorescent X-ray analyzer(Model 3063 M, made by RIGAKUDENKI KOGYO Co., Ltd.). The magnetic properties of the alloy particles are measured under the external magnetic field of 10 KOe, and the properties of the magnetic tapes are the results measured under the external magnetic field of 2 KOe, and the gloss of the coating film is the value measured by a glossmeter (made by NIPPON DENSHOKU KOGYO Co., Ltd.) of the angle of incident light of 60° while comparing to the gloss of the standard plate (regarded as 89%) and shown in percentage thereof.

EXAMPLES 1 to 12 and COMPARATIVE EXAMPLE 1

Preparation of spindle goethite particles

EXAMPLE 1

Into 20 liters of an aqueous solution of 3.53 mol of sodium carbonate, to which 12.7 g of sodium silicate (so-called sodium silicate No. 3)(content of $SiO_2$ being 28.55 % by weight) had been preliminarily added so that the aqueous solution contains 0.20 atomic % (calculated as Si) to Fe, 30 liters of an aqueous solution of ferrous sulfate at a concentration of 1.0 mol of $Fe^{2+}$/liter were added at a pH of 9.9 and at a temperature of 50° C. to form an aqueous suspension of $FeCO_3$ containing Si.

Into the thus obtained suspension of $FeCO_3$ containing Si, air was blown at a rate of 130 liters/min at 50° C. for 6.5 hours, thereby obtaining the goethite particles containing Si. The end point of the above-mentioned oxidation was judged by the disappearance of blue colour formation of $Fe^{2+}$ after taking a portion of the thus treated aqueous suspension and adjusting the portion to acidic by hydrochloric acid, while using the aqueous solution of red prussiate of potash. After the oxidation was over, the thus formed goethite particles were collected by filtration, washed with water, dried and pulverized.

The thus obtained spindle goethite particles containing Si showed an average length of the major axis of 0.38 μm and an aspect ratio (major/minor) of 2.5:1 when viewed under an electronmicroscope and were not contaminated by dendrites. In addition, as a result of X-ray fluorescent analysis, the spindle goethite particles contained 0.19 atomic % (calculated as Si) to Fe therein, the apparent density thereof being 0.41 $g/cm^3$.

EXAMPLES 2 to 12

In the same manner as in Example 1 except for changing the kinds of the aqueous solution of $Fe^{2+}$ and the alkali carbonate, the amounts thereof, the kinds of the water-soluble silicate, the amount of addition thereof and the time of addition thereof and the kinds, the amount of addition of metal ion and the temperature of addition of metal ion as shown in Table 1, various kinds of spindle goethite particles were produced.

The main condition of their preparation and the specific properties of the thus obtained goethite particles are shown also in Table 1.

COMPARATIVE EXAMPLE 1

In the same manner as in Example 1 except for not adding sodium silicate into the aqueous solution of sodium carbonate, goethite particles were produced. The thus obtained goethite particles showed an average length of the major axis of 0.55 μm and an aspect ratio of (major/minor) 7:1 under an electronmicroscope, and the apparent density thereof was 0.33 g/cm$^3$.

EXAMPLES 13-20 and COMPARATIVE EXAMPLE 2

Preparation of spindle hematite particles of a substantially high density

EXAMPLE 13

By subjecting 700 g of the spindle goethite particles containing Si obtained in Example 1 to thermal treatment in air at 500° C., the spindle hematite particles containing Si of a substantially high density were obtained.

As a result of observation of these particles under an electronmicroscope, the particles showed the average length of the major axis of 0.38 micrometer and the aspect ratio (major/minor) of 2.5:1 and were uniform in particle size, and not contaminated by dendrites.

EXAMPLES 14 to 20 and COMPARATIVE EXAMPLE 2

In the same manner as in Example 13 except for changing the kind of the goethite particles to be thermally treated, the temperature of thermal treatment and the kind of the non-reducing atmosphere as shown in Table 2, spindle hematite particles containing Si, which were substantially high in density were produced. The main conditions of their preparation and the specificities of the thus obtained hematite particles are shown also in Table 2.

As a result of observation under an electronmicroscope, the thus obtained spindle hematite particles containing Si which were substantially high in density were uniform in particle size and not contaminated by dendrites.

EXAMPLE 21

Preparation of spindle hematite particles

By thermally dehydrating 700 g of the spindle goethite particles containing Si which were obtained in Example 8, in air at 300° C., the spindle hematite particles containing Si were obtained.

As a result of observation thereof under an electronmicroscope, the thus obtained hematite particles showed the average length of the major axis of 0.23 μm and the aspect ratio (major/minor) of 2:1, and the particles were uniform in particle size without contamination by dendrites.

In addition, as a result of X-ray fluorescent analysis thereof, the hematite particles contained 1.49 atomic % (calculated as Si) to Fe therein, and the apparent density thereof was 0.50 g/cm$^3$.

EXAMPLES 22 to 33, and COMPARATIVE EXAMPLE 3

Preparation of the spindle ferromagnetic alloy Particles

EXAMPLE 22

In a 3 liter-retort-type reducing apparatus, 150 g of the spindle hematite particles containing Si obtained in Example 13 were introduced, and while supplying gaseous hydrogen at a rate of 35 liters/min, the hematite particles were subjected to thermal reduction at a reducing temperature of 300° C.

The thus obtained spindle ferromagnetic iron alloy particles containing Si were once immersed in toluene for preventing their rapid oxydation in the case where they are drawn out to atmospheric air, and by evaporating toluene, the surface of the ferromagnetic alloy particles was coated with a protective oxidized layer.

The thus obtained spindle ferromagnetic alloy particles contained 0.194 atomic % (calculated as Si) to Fe therein, as revealed by X-ray fluorescent analysis, and as a result of observation under an electronmicroscope the average length of the major axis thereof was 0.35 μm and the aspect ratio (major/minor) thereof was 2.5:1, and the particles were uniform in particle size and not contaminated by dendrites.

In addition, the specific surface area, the apparent density, the coercive force and saturation magnetization of the spindle ferromagnetic alloy particles containing Si obtained in Example 22 were respectively 30.5 m$^2$/g, 0.64 g/cm$^3$, 870 Oe and 150.2 emu/g.

EXAMPLES 23 to 33 and COMPARATIVE EXAMPLE 3

In the same manner as in Example 22 except for changing the kind of the starting material and the temperature of thermal reduction as shown in Table 3, spindle ferromagnetic alloy particles containing Si were produced, the conditions in the production and the specific properties of the products being shown also in Table 3.

As a result of examination of the products in Examples 23 to 33 under an electronmicroscope, every ferromagnetic alloy particles was uniform in particle size and shape and not contaminated by dendrites.

Figure 4:
FIGS. 4 to 6 are the electron microscope photographs taken at a magnification of 20,000 times of the spindle ferromagnetic alloy particles and, particularly.
Figure 5:
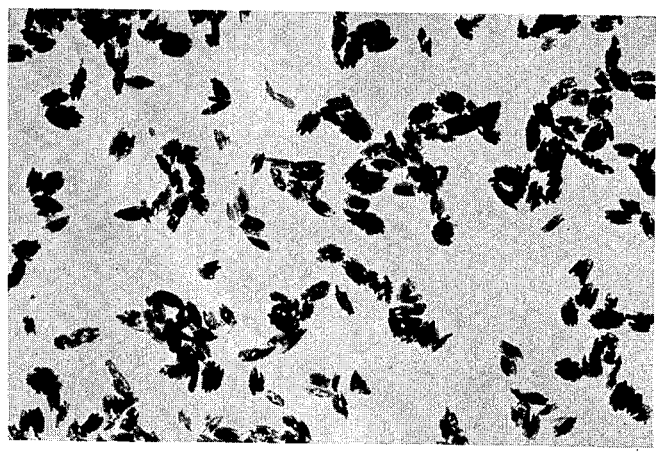
Figure 6:
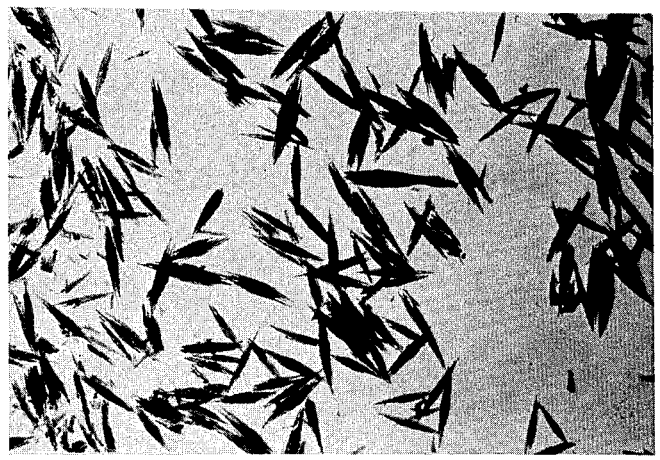

Of the attached drawings, FIG. 4 and FIG. 5 respectively show the electron microscope photograph (enlarged by 20,000 times) of the spindle ferromagnetic alloy particles containing Si obtained in Examples 23 and 27, and FIG. 6 is the electron microscope photograph (enlarged by 20,000 times) of the spindle ferromagnetic iron particles obtained in Comparative Example 3.

EXAMPLE 34

Preparation of spindle hematite particles

By thermally dehydrating 1000 g of the spindle goethite particles containing Si which were obtained in Example 12, in air at 320° C., the spindle hematite particles containing Si were obtained.

As a result of observation thereof under an electronmicroscope, the thus obtained hematite particles showed the average length of the major axis of 0.22 μm and the aspect ratio (major/minor) of 1.5:1, and the particles were uniform in particle size without contamination by dendrites.

In addition, as a result of X-ray fluorescent analysis thereof, the hematite particles contained 1.00 atomic % (calculated as Si) to Fe therein, and the apparent density thereof was 0.49 g/cm$^3$.

EXAMPLES 35 to 45 and COMPARATIVE EXAMPLE 4

Preparation of the spindle goethite particles and the spindle hematite particles, which are covered with the phosphorus compound and the silicon compound

EXAMPLE 35

In 50 liters of water, 2500 g of a paste of the spindle goethite particles containing Si, which had been obtained, collected by filtration and washed with water in Example 1 (containing about 1000 g of the dried, spindle goethite particles containing Si) were suspended, thereby obtaining an aqueous suspension of pH of 8.3.

Into the thus prepared aqueous suspension, 300 ml of an aqueous solution of 7 g of sodium hexametaphosphate (corresponding to 0.55 atomic % (calculated as P) to F in the spindle goethite particles containing Si) were added, and the suspension was stirred for 30 min.

Thereafter, into the thus prepared suspension, 120 g of sodium silicate (commerciallized under the name of Water Glass No. 3)(corresponding to 5.07 atomic % (calculated as Si) to Fe in the spindle goethite particles containing Si) were added, and after stirring the thus treated suspension for 60 min, an aqueous 10% solution of acetic acid was added thereto to adjust the pH of the suspension to 5.5 and the suspension was subjected to filtration by a filterpress to collect the thus treated particles. The thus collected particles were dried to be the spindle goethite particles containing Si and had been coated with the phosphorus compound and the silicon compound, the properties thereof being shown in Table 4.

EXAMPLES 36 to 45 and COMPARATIVE EXAMPLE 4

In the same manner as in Example 35 except for changing the kinds of particles to be treated, pH of the aqueous suspension at the time of adding the phosphate, the amount thereof, the amount of addition of the water-soluble silicate and the adjusted pH as shown in Table 4, ten kinds of the spindle goethite particles containing Si or the spindle hematite particles containing Si nd which had been coated with the phosphorus compound and the silicon compound were obtained, the propertiesof the thus obtained particles being shown also in Table 4 together with those of the particles produced in Comparative Example 4.

EXAMPLES 46 to 55 and COMPARATIVE EXAMPLE 5

Preparation of the spindle hematite particles containing Si, coated with the phosphorus compound and silicon compound which are substantially high in density

EXAMPLE 46

By thermally treating 800 g of the spindle goethite particles containing Si, have been coated with the phosphorus compound and the silicon compound and obtained in Example 35 in air at 700° C., the spindle hematite particles containing Si, coated with the phosphorus compound and the silicon compound, which are substantially high in density, were obtained.

As a result of observation of these particles under an electronmicroscope, the particles showed the average length of the major axis of 0.38 micrometer, the aspect ratio (major/minor) of 2.5:1 and were uniform in particle size and shape, and not contaminated by dendrites.

EXAMPLES 47 to 55 and COMPARATIVE EXAMPLE 5

In the same manner as in Example 46 except for changing the kind of the goethite particles to be thermally treated, the temperature of thermal treatment and the kind of the non-reducing atmosphere as shown in Table 5, spindle hematite particles containing Si, coated with the phosphorus compound and silicon compound, which were substantially high in density were produced. The conditions of the thermal treatment and the specificities of the thus obtained particles are shown also in Table 5.

As a result of observation under an electronmicroscope, the thus obtained spindle hematite particles containing Si, coated with phosphorus compound and silicon compound, which were substantially high in density were uniform in particle size and shape and not contaminated by dendrites.

EXAMPLES 56 to 66 and COMPARATIVE EXAMPLE 6

Preparation of the spindle ferromagnetic alloy particles

EXAMPLE 56

In a 3 liter-retort-type reducing apparatus, 120 g of the spindle hematite particles containing Si coated with the phosphorus compound and the silicon compound, which were obtained in Example 46 were introduced and subjected to thermal reduction while rotating the apparatus and supplying gaseous hydrogen at a flow rate of 35 liters/min at a temperature of thermal reduction of 400° C.

The thus obtained spindle ferromagnetic alloy particles containing Si, coated with the phosphorus compound and silicon compound by thermal reduction were once immersed into toluene, and by evaporating toluene, a protective oxidized layer was formed on the particles in order to prevent the rapid oxidation at the time when the particles are, at first, contacted to air.

The thus obtained spindle ferromagnetic alloy particles containing Si and P contained 4.25 atomic % (calculated as Si) and 0.55 atomic % (calculated as P) to Fe therein as a result of X-ray fluorescent analysis, and it was found as a result of observation under an electronmicroscope that the particles were uniform in particle size and shape of an average length of the major axis of 0.38 μm with the aspect ratio (major/minor) of 2.5:1 and not contaminated by dendrites.

In addition, the particles showed the following properties.

Specific surface area 42.4 m$^2$/g
Apparent density 0.63 g/cm$^3$
Coercive force 875 Oe and
Saturation magnetization 152.3 emu/g.

EXAMPLES 57 to 67 and COMPARATIVE EXAMPLE 6

In the same manner as in Example 56 except for changing the kind of the starting material and the temperature of thermal reduction as shown in Table 6, spindle ferromagnetic alloy particles containing Si and P were produced, the conditions in the production and the specific properties of the thus obtained products being shown also in Table 6.

As a result of examination of the products in Examples 57 to 66 under an electronmicroscope, every product was uniform in particle size and not contaminated by dendrites.

Figure 7:
FIGS. 7 and 8 are the electron microscope photographs taken at a magnification of 20,000 times of the spindle ferromagnetic alloy particles and, particularly.
Figure 8:
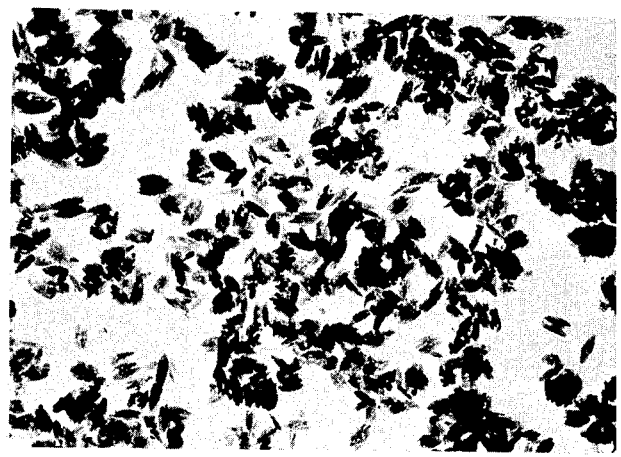

Of the attached drawings, FIG. 7 and FIG. 8 respectively show the electron microscope photograph (enlarged by 20,000 times) of the spindle ferromagnetic alloy particles containing Si and P obtained in Examples 57 and 59, respectively.

EXAMPLES 67 to 77

Preparation of magnetic tapes

EXAMPLE 67

After combining the spindle ferromagnetic alloy particles containing Si and P, which were obtained in Example 56 with a dispersing agent, a copolymer of vinyl chloride and vinyl acetate, a thermoplastic polyurethane resin and a mixed solvent consisting of toluene, methyl ethyl ketone and methyl isobutyl ketone each in a suitable amount, thereby obtaining a material with a predetermined composition, the material was treated in a ball-mill for 8 hours to obtain a magnetic paint.

After adjusting the viscosity of the thus obtained magnetic paint to a suitable level by adding the above-mentioned mixed solvent, the thus adjusted magnetic paint was applied on a film of a polyester resin and by drying the thus applied film, a magnetic tape was prepared. The magnetic properties of the thus prepared magnetic tape were as follows.

Coercive force (Hc): 820 Oe
Residual magnetic flux density (Br): 3290 Gauss
Squareness ratio (Br/Bm): 0.69
Orientation ratio: 1.40
Gloss: 82%

EXAMPLES 68 to 77

In the same manner as in Example 67 except for changing the kinds of the spindle ferromagnetic alloy particles containing P and Si as shown in Table 7, magnetic tapes were prepared, the properties of the thus prepared magnetic tapes being shown also in Table 7.

REFERENCE EXAMPLE

In a 3 liter-retort-type reducing apparatus, 170 g of the spindle goethite particles containing Si obtained in Example 1 were introduced, and while rotating the apparatus and supplying gaseous hydrogen at a rate of 35 liters/min, the goethite particles were subjected to thermal reduction at a reducing temperature of 350° C.

The thus obtained spindle ferromagnetic alloy particles containing Si as a result of X-ray fluorescent analysis, contained 0.195 atomic % (calculated as Si) to Fe therein, and by observation under an electronmicroscope, the average length of the major axis and the aspect ratio (major/minor) of the particles were 0.34 $\mu$m and 2.5:1, respectively. The particles showed the specific surface area of 29.0 $m^2/g$ and apparent density of 0.62 $g/cm^3$. The magnetic properties of the particles were as follows.

Coercive force (Hc): 845 Oe and
Saturation magnetization: 151.0 emu/g

In the same manner as in Example 67 except for using the above-mentioned spindle ferromagnetic alloy particles containing P and Si, a magnetic tape as prepared.

The specific properties of the thus prepared magnetic tape were as follows.

Coercive force (Hc): 780 Oe
Residual magnetic flux density: 2640 Gauss
Squareness ratio (Br/Bm): 0.645
Orientation ratio: 1.19 and
Gloss: 20%.

TABLE 1

| Examples and Comparative Example | Ferrous Salt Kind | Formation of $FeCO_3$ | | | | | | |
|---|---|---|---|---|---|---|---|---|
| | | Alkali Carbonate | | Water-soluble Silicate | | | Other Metal Ion than Fe | |
| | | Kind | Concentration (mol/l) | Kind | Amount of Si added to Fe (Atomic %) | Time of Addition | Kind | Amount (Atomic %) |
| Example | | | | | | | | |
| 1 | $FeSO_4$ | $Na_2CO_3$ | 3.53 | Sodium Silicate | 0.20 | B | — | — |
| 2 | " | " | " | Sodium Silicate | 0.10 | " | $CoSO_4$ | 2.0 |
| 3 | " | " | " | Potassium Silicate | 0.10 | " | — | — |
| 4 | " | $K_2CO_3$ | " | Sodium Silicate | 0.50 | " | $CoSO_4$ | 5.0 |
| 5 | " | $(NH_4)_2CO_3$ | " | Sodium Silicate | 1.00 | " | — | — |
| 6 | " | $Na_2CO_3$ | 3.63 | Sodium Silicate | 5.00 | " | $CoSO_4$ $NiSO_4$ | 2.0 4.0 |
| 7 | " | " | 3.53 | Sodium Silicate | 10.00 | " | — | — |
| 8 | $FeCl_2$ | " | " | Sodium Silicate | 1.5 | C | — | — |
| 9 | " | " | " | Sodium Silicate | 8.00 | B | $ZnSO_4$ | 2.0 |
| 10 | $FeSO_4$ | " | 3.63 | Potassium Silicate | 0.5 | A | $ZnSO_4$ $NiSO_4$ | 1.5 5.0 |
| 11 | " | " | 3.55 | Sodium Silicate | 1.0 | B | $ZnSO_4$ | 1.0 |

TABLE 1-continued

| | | | | | | | | |
|---|---|---|---|---|---|---|---|---|
| 12 | " | " | " | Sodium Silicate | 1.0 | B | NiSO$_4$ | 1.0 |
| Comparative Example 1 | FeSO$_4$ | Na$_2$CO$_3$ | 3.53 | — | — | — | — | — |

| Examples and Comparative Example | Formation of FeCO$_3$ | | Formation of spindle goethite particles Specific Properties | | | | |
|---|---|---|---|---|---|---|---|
| | PH | Temperature (°C.) | Content of Si to Fe (Atomic %) | Content of other metal to Fe (Atomic %) | Major axis (μm) | Aspect Ratio (Major/Minor) | Apparent Density (g/cm$^3$) |
| Example | | | | | | | |
| 1 | 9.9 | 50 | 0.19 | — | 0.38 | 2.5:1 | 0.41 |
| 2 | 9.8 | " | 0.10 | Co/Fe 1.99 | 0.30 | 3:1 | 0.42 |
| 3 | 9.8 | " | 0.10 | — | 0.35 | 3:1 | 0.40 |
| 4 | 9.9 | " | 0.49 | Co/Fe 4.98 | 0.20 | 2:1 | 0.49 |
| 5 | 9.9 | " | 1.01 | — | 0.20 | 1.5:1 | 0.50 |
| 6 | 10.0 | " | 5.00 | Co/Fe 1.98 Ni/Fe 3.97 | 0.17 | 1.5:1 | 0.50 |
| 7 | 10.2 | 55 | 10.02 | — | 0.16 | 1:1 | 0.52 |
| 8 | 9.9 | " | 1.50 | — | 0.23 | 2:1 | 0.48 |
| 9 | 10.1 | 50 | 8.01 | Zn/Fe 1.99 | 0.15 | 1:1 | 0.53 |
| 10 | 9.8 | " | 0.50 | Zn/Fe 1.50 Ni/Fe 4.99 | 0.20 | 2:1 | 0.49 |
| 11 | 9.8 | 60 | 1.03 | Zn/Fe 1.02 | 0.22 | 1.5:1 | 0.45 |
| 12 | 9.9 | " | 1.01 | Ni/Fe 0.99 | 0.22 | 1.5:1 | 0.44 |
| Comparative Example 1 | 9.8 | 50 | — | — | 0.55 | 7:1 | 0.33 |

Notes: Time of addition,
A: added into the aqueous solution of the ferrous salt.
B: added to the alkali carbonate.
C: added into the aqueous suspension containing FeCO$_3$

TABLE 2

| Examples and Comparative Example | Spindle Goethite Particles (Example No. and Comparative Example No.) | Thermal Treatment | | Spindle Hematite Particles Properties | |
|---|---|---|---|---|---|
| | | Temperature (°C.) | Non-reducing Gas | Major Axis (μm) | Aspect Ratio (Major/Minor) |
| Example | Example | | | | |
| 13 | 1 | 500 | Air | 0.38 | 2.5:1 |
| 14 | 2 | 450 | " | 0.30 | 3:1 |
| 15 | 3 | 450 | " | 0.35 | 3:1 |
| 16 | 6 | 550 | " | 0.17 | 1.5:1 |
| 17 | 7 | 550 | " | 0.16 | 1:1 |
| 18 | 10 | 400 | N$_2$ Gas | 0.20 | 2:1 |
| 19 | 11 | 500 | " | 0.22 | 1.5:1 |
| 20 | 12 | 500 | " | 0.22 | 1.5:1 |
| Comparative Example 2 | Comparative Example 1 | 450 | Air | 0.55 | 7:1 |

TABLE 3

| Examples and Comparative Example | Spindle Goethite or Hematite Particles | Temperature of Reduction (°C.) | Spindle Ferromagnetic Alloy Particles | | | | | |
|---|---|---|---|---|---|---|---|---|
| | | | Content of Si to Fe (Atomic %) | Content of other Metal to Fe (Atomic %) | Particle Properties | | Magnetic Properties | |
| | | | | | Major Axis (μm) | Aspect Ratio (Major/Minor) | Coercive Force (Hc) (Oe) | Saturation Magnetization ($\sigma_s$) (emu/g) |
| Example | Example | | | | | | | |
| 22 | 13 | 300 | 0.194 | — | 0.35 | 2.5:1 | 870 | 150.2 |
| 23 | 14 | 350 | 0.101 | Co/Fe 1.994 | 0.28 | 3:1 | 930 | 160.5 |
| 24 | 15 | 380 | 0.100 | — | 0.33 | 3:1 | 900 | 167.3 |
| 25 | 16 | 450 | 4.98 | Co/Fe 1.97 Ni/Fe 3.98 | 0.15 | 1.5:1 | 630 | 149.0 |
| 26 | 17 | 480 | 10.00 | — | 0.15 | 1:1 | 555 | 116.2 |
| 27 | 18 | 380 | 0.501 | Zn/Fe 1.49 Ni/Fe 5.00 | 0.18 | 2:1 | 800 | 164.5 |
| 28 | 19 | 400 | 1.01 | Zn/Fe 1.01 | 0.20 | 1.5:1 | 665 | 168.3 |
| 29 | 20 | 400 | 1.00 | Ni/Fe 0.99 | 0.20 | 1.5:1 | 673 | 166.2 |
| 30 | 21 | 400 | 1.49 | — | 0.20 | 1.5:1 | 630 | 165.4 |
| 31 | 4 | 380 | 0.493 | Co/Fe 4.98 | 0.17 | 1.5:1 | 580 | 159.3 |
| 32 | 5 | 380 | 1.00 | — | 0.17 | 1:1 | 500 | 154.2 |
| 33 | 9 | 420 | 7.99 | Zn/Fe 1.98 | 0.13 | 1:1 | 530 | 135.6 |
| Comparative Example | Comparative Example | 350 | — | — | 0.53 | 7:1 | 1230 | 130.4 |

TABLE 3-continued

| Examples and Comparative Example | Spindle Goethite or Hematite Particles | Temperature of Reduction (°C.) | Spindle Ferromagnetic Alloy Particles |||||
|---|---|---|---|---|---|---|---|
| | | | Content of Si to Fe (Atomic %) | Content of other Metal to Fe (Atomic %) | Particle Properties || Magnetic Properties ||
| | | | | | Major Axis (μm) | Aspect Ratio (Major/Minor) | Coercive Force (Hc) (Oe) | Saturation Magnetigation ($\sigma_s$) (emu/g) |
| 3 | 2 | | | | | | | |

TABLE 4

| Examples and Comparative Example | Treated Particles | pH of Suspension | Coating Treatment of Phosphorus Compound Amount of P added to Fe (Atomic %) | Coating Treatment of Silicon Compound Amount of Si added to Fe (Atomic %) | Spindle Goethite Particles Coated with Phosphorus Compound and Silicon Compound ||||
|---|---|---|---|---|---|---|---|---|
| | | | | | Adjusted pH | Si/Fe (Atomic %) | Content of other Metal to Fe (Atomic %) | P/Fe (Atomic %) |
| Example | Example | | | | | | | |
| 35 | 1 | 8.3 | 0.55 | 5.07 | 5.5 | 4.25 | — | 0.55 |
| 36 | 2 | 8.2 | 0.48 | 6.00 | 6.0 | 4.50 | Co/Fe = 1.98 | 0.48 |
| 37 | 3 | 8.4 | 1.98 | 5.50 | 4.5 | 5.10 | — | 1.96 |
| 38 | 4 | 8.1 | 0.71 | 8.00 | 6.0 | 6.50 | Co/Fe = 4.98 | 0.71 |
| 39 | 5 | 8.1 | 1.19 | 5.07 | 5.0 | 5.57 | — | 1.18 |
| 40 | 6 | 8.4 | 0.55 | 7.60 | 6.5 | 10.85 | Co/Fe = 1.97 Ni/Fe = 3.36 | 0.55 |
| 41 | 8 | 8.2 | 1.58 | 4.22 | 5.0 | 5.40 | — | 1.57 |
| 42 | 9 | 8.1 | 0.32 | 0.84 | 6.5 | 8.70 | Zn/Fe = 1.99 | 0.31 |
| 43 | 10 | 8.3 | 0.48 | 3.00 | 6.0 | 2.80 | Zn/Fe = 1.50 Ni/Fe = 4.97 | 0.47 |
| 44 | 12 | 8.5 | 0.63 | 5.50 | 7.0 | 4.95 | Ni/Fe = 0.97 | 0.63 |
| 45 | 34 | 9.0 | 0.40 | 5.07 | 6.5 | 5.15 | Ni/Fe = 0.97 | 0.39 |
| Comparative Example 4 | Comparative Example 1 | 8.2 | 0.55 | 5.07 | 6.0 | 3.58 | — | 0.55 |

TABLE 5

| Examples and Comparative Example | Spindle Getite Particles coated with Phosphorus Compound and Silicon Compound | Thermal Treatment || Spindle hematite ($\alpha$-Fe$_2$O$_3$) Particles Coated with Phosphorus Compound and Silicon Compound Particle Properties ||
|---|---|---|---|---|---|
| | | Temperature (°C.) | Non-reducing Gas | Major Axis (μm) | Aspect Ratio (Major/Minor) |
| Example | Example | | | | |
| 46 | 35 | 700 | Air | 0.38 | 2.5:1 |
| 47 | 36 | 770 | " | 0.30 | 3:1 |
| 48 | 37 | 750 | " | 0.35 | 3:1 |
| 49 | 38 | 850 | N$_2$ Gas | 0.20 | 2:1 |
| 50 | 39 | 600 | " | 0.20 | 1.5:1 |
| 51 | 40 | 780 | Air | 0.17 | 1.5:1 |
| 52 | 41 | 650 | " | 0.23 | 2:1 |
| 53 | 42 | 500 | " | 0.15 | 1:1 |
| 54 | 43 | 550 | " | 0.20 | 2:1 |
| 55 | 44 | 750 | " | 0.22 | 1.5:1 |
| Comparative Example 5 | Comparative Example 4 | 700 | " | 0.55 | 7:1 |

TABLE 6

| Examples and Comparative Example | Spindle Goethite or Hematite Particles | Temperature of Reduction (°C.) | Spindle Ferromagnetic Alloy Particles |||||||
|---|---|---|---|---|---|---|---|---|---|
| | | | Content of Si to Fe (Atomic %) | Content of other Metal to Fe (Atomic %) | P/Fe (Atomic %) | Particle Properties || Magnetic Properties ||
| | | | | | | Major Axis (μm) | Aspect Ratio (Major/Minor) | Coercive Force (Hc) (Oe) | Saturation Magnetization ($\sigma_s$) (emu/g) |
| Example | Example | | | | | | | | |
| 56 | 46 | 400 | 4.25 | — | 0.55 | 0.38 | 2.5:1 | 875 | 152.3 |
| 57 | 47 | 420 | 4.50 | Co/Fe = 1.98 | 0.48 | 0.30 | 3:1 | 940 | 161.4 |
| 58 | 48 | 450 | 5.09 | — | 1.95 | 0.34 | 3:1 | 905 | 168.8 |
| 59 | 49 | 540 | 6.50 | Co/Fe = 4.98 | 0.71 | 0.18 | 2:1 | 650 | 160.5 |
| 60 | 50 | 400 | 5.56 | — | 1.18 | 0.20 | 1.5:1 | 550 | 155.7 |
| 61 | 51 | 500 | 10.85 | Co/Fe = 1.96 Ni/Fe = 3.36 | 0.55 | 0.16 | 1.5:1 | 635 | 152.3 |
| 62 | 52 | 420 | 5.41 | — | 1.57 | 0.22 | 2:1 | 650 | 167.5 |
| 63 | 53 | 380 | 8.70 | Zn/Fe = 1.99 | 0.30 | 0.15 | 1:1 | 535 | 136.5 |
| 64 | 54 | 390 | 2.79 | Zn/Fe = 1.49 Ni/Fe = 4.97 | 0.47 | 0.20 | 2:1 | 820 | 166.3 |
| 65 | 55 | 430 | 4.95 | Ni/Fe = 0.97 | 0.63 | 0.22 | 1.5:1 | 680 | 169.1 |

TABLE 6-continued

| Examples and Comparative Example | Spindle Goethite or Hematite Particles | Temperature of Reduction (°C.) | Spindle Ferromagnetic Alloy Particles | | | | | | | |
|---|---|---|---|---|---|---|---|---|---|---|
| | | | Content of Si to Fe (Atomic %) | Content of other Metal to Fe (Atomic %) | P/Fe (Atomic %) | Particle Properties | | Magnetic Properties | |
| | | | | | | Major Axis (μm) | Aspect Ratio (Major/Minor) | Coercive Force (Hc) (Oe) | Saturation Magnetization ($\sigma_s$) (emu/g) |
| 66 | 45 | 420 | 5.14 | Ni/Fe = 0.97 | 0.39 | 0.22 | 1.5:1 | 675 | 168.5 |
| Comparative Example 6 | Comparative Example 5 | 400 | 3.57 | — | 0.54 | 0.53 | 7:1 | 1240 | 136.8 |

TABLE 7

| Examples | Ferromagnetic Alloy Particles | Properties of Magnetic Tape | | | | |
|---|---|---|---|---|---|---|
| | | Coercive Force(Hc) (Oe) | Residual Magnetic Flux Density (Br) (Gauss) | Squareness ratio (Br/Bm) | Orientation ratio (Br/Bm)∥ / (Br/Bm)⊥ | Gloss (%) |
| Example 67 | Example 56 | 820 | 3290 | 0.69 | 1.40 | 82 |
| Example 68 | Example 57 | 890 | 3550 | 0.73 | 1.63 | 91 |
| Example 69 | Example 58 | 870 | 3570 | 0.72 | 1.56 | 78 |
| Example 70 | Example 59 | 620 | 3240 | 0.67 | 1.36 | 110 |
| Example 71 | Example 60 | 530 | 3150 | 0.62 | 1.21 | 107 |
| Example 72 | Example 61 | 610 | 3100 | 0.63 | 1.22 | 120 |
| Example 73 | Example 62 | 630 | 3390 | 0.68 | 1.40 | 103 |
| Example 74 | Example 63 | 530 | 2850 | 0.57 | 1.18 | 116 |
| Example 75 | Example 64 | 800 | 3460 | 0.70 | 1.45 | 104 |
| Example 76 | Example 65 | 660 | 3250 | 0.66 | 1.33 | 100 |
| Example 77 | Example 66 | 660 | 3290 | 0.66 | 1.35 | 96 |

What is claimed is:

1. Spindle ferromagnetic iron base alloy particles substantially dendrite free and having an aspect ratio (major:minor) of not more than 3:1, a coercive force of about 500 to 1000 Oe, and containing about 0.1 to 13 atomic % of Si to Fe.

2. Spindle ferromagnetic iron base alloy particles according to claim 1, which particles have the aspect ratio (major:minor) orf less than 2:1, and the coercive force of about 500 to 850 Oe, and contain about 0.3 to 8 atomic % of Si to Fe.

3. Spindle ferromagnetic iron base alloy particles according to claim 1, which particles contain about 0.3 to 13 atomic % of Si to Fe and further contain about 0.1 to 2.5 atomic % of P to Fe.

4. Spindle ferromagnetic iron base alloy particles according to claim 3, which particles have the aspect ratio of less than 2:1 and the coercive force of about 500 to 850 Oe, and contain about 0.5 to 11 atomic % of silicon to iron and about 0.1 to 2.5 atomic % of P to Fe 5. The particles of any one of claims 1-4 for use in preparing magnetic recording media.

6. The particles of any one of claim 1-4 for use in preparing magnetic recording media for use in recording short wave signals.

7. Metal powder for use in magnetic recording media comprising:
   substantially dendrite free particles of substantially uniform shape wherein the particles contain about 0.1 to 13% Si to Fe and the major length of the particles does not exceed three times the minor length of the particles.

8. The powder of claim 7 having a coercive force of about 500 to 1000 Oe.

9. Spindle ferromagnetic iron base alloy particles according to claim 1, which particles are produced by oxidizing $FeCO_3$ in an aqueous suspension by blowing an oxygen-containing gas into the aqueous suspension containing $FeCO_3$, obtained by reacting an aqueous solution of a ferrous salt with an alkali carbonate, wherein a water-soluble silicate is added into said alkali carbonate, into said aqueous solution of a ferrous salt or into said aqueous suspension containing $FeCO_3$, before blowing said oxygen-containing gas thereinto in an amount of 0.1 to 13 atomic % (calculated as Si) to Fe (of said ferrous salt), thereby obtaining spindle goethite particles containing Si, and subjecting the thus obtained spindle goethite particles containing Si or the spindle hematite particles containing Si obtained by thermally dehydrating said spindle goethite particles containing Si to thermal reduction in a reducing gas.

10. Spindle ferromagnetic iron base alloy particles according to claim 9, wherein said water-soluble silicate is added in amount of 0.3 to 8 atomic % (calculated as Si) to Fe of said ferrous salt.

11. Spindle ferromagnetic iron base alloy particles according to claim 9, wherein the thus obtained spindle goethite particles containing Si or the spindle hematite particles containing Si obtained by thermally dehydrating said spindle goethite particles containing Si is brought into suspension in water, a phosphate is added into said suspension in an amount of 0.1 to 2.5 atomic % (calcualted as P) to Fe of said ferric iron oxide hydroxide at a pH of higher than 8, a water-soluble silicate is further added into the resultant aqueous suspension in an amount of 0.2 to 8.0 atomic % (calculated as Si) to Fe of said ferric iron oxide hydroxide so that the total amount of said added silicate is less than 13 atomic % (calculated as Si) to Fe of said ferric iron oxide hydroxide, the pH of the thus obtained aqueous suspension is adjusted to from 3 to 7, thereby obtaining spindle goethite particles containing Si or spindle hematite particles containing Si coated with a phosphorus compound and a silicon compound, and the thus obtained spindle goethite particles containing Si coated with phosphorus compound and silicon compound or the thus obtained spindle hematite particles containing Si coated with phosphorus compound and silicon compound is subjected to thermal reduction in a reducing gas.

12. Spindle ferromagnetic iron base alloy particles according to claim 9, which particles are produced by oxidizing $FeCO_3$, in an aqueous suspension by blowing an oxygen-containing gas into the aqueous suspension containing $FeCO_3$, obtained by reacting an aqueous solution of a ferrous salt with an alkali carbonate, wherein a water-soluble silicate is added into said alkali carbonate, into said aqueous solution of a ferrous salt or into said aqueous suspension contaning $FeCO_3$, before blowing said oxygen-containing gas thereinto in an amount of 0.1 to 13 atomic % of Si to Fe of said ferrous salt, thereby obtaining spindle goethite particles containing Si, subjecting the thus obtained spindle geothite particles containing Si to thermal treatment in a nonreducing atmosphere at a temperature of from 400 to 600 degrees Celsius, thereby obtaining spindle hematite particles containing Si which are substantially high in density, and subjecting the thus obtained spindle hematite particles containing Si to thermal reduction in a reducing gas.

13. Spindle ferromagnetic iron base alloy particles according to claim 12, wherein said water-soluble silicate is added in amount of 0.3 to 8 atomic % of Si to Fe of said ferrous salt.

14. Spindle ferromagnetic iron base alloy particles according to claim 12, wherein the thus obtained spindle goethite particles containing Si is brought into suspension in water, a phosphate is added into said suspension in amount of 0.1 to 2.5 atomic % (calculated as P) to Fe of said ferric iron oxide hydroxide at a pH of higher than 8, a water-soluble silicate is further added into the resultant aqueous suspension in an amount of 0.2 to 8.0 atomic % (calculated as Si) to Fe of said ferric iron oxide hydroxide so that the total amount of said added silicate is less than 13 atomic % (calculated as Si) to Fe of said ferric iron oxide hydroxide, the pH of the thus obtained aqueous aqueous suspension is adjusted to from 3 to 7, thereby obtaining said spindle goethite particles containing Si coated with a phosphorus compound and a silicon compound, the spindle goethite particles containing Si covered with phosphorus compound and silicon compound are subjected to thermal treatment in a nonreducing atmosphere at 500 to 900 degrees Celsius, thereby obtaining the spindle hematite particles containing Si which are substantially high in density and are coated with phosphorus compound and silicon compound, and thus obtained spindle hematite particles containing Si coated with phosphorus compound and silicon compound are subjected to thermal reduction in a reducing gas.

15. Spindle ferromagnetic iron base alloy particles according to claim 1, which particles have an average length of the major axis of 0.15 to 0.38 μm.

* * * * *